United States Patent
Bartha

[11] Patent Number: 5,929,952
[45] Date of Patent: Jul. 27, 1999

[54] STATIC THREE-DIMENSIONAL GRAPHICAL BACKGROUND FOR LIQUID CRYSTAL DISPLAYS

[75] Inventor: Istvan Bartha, Kumla, Sweden

[73] Assignee: Ericsson Inc., Research Triangle Park, N.C.

[21] Appl. No.: 08/881,850

[22] Filed: Jun. 24, 1997

[51] Int. Cl.⁶ .......................... G02F 1/1335; G01D 11/28; F21V 7/00; G09G 5/00
[52] U.S. Cl. .............................. 349/65; 349/104; 362/26; 362/1; 345/5
[58] Field of Search .................................. 349/106, 146, 349/104, 165, 65; 345/50, 4, 5; 40/448; 362/26, 31

[56] References Cited

U.S. PATENT DOCUMENTS

| | | | |
|---|---|---|---|
| 4,021,945 | 5/1977 | Sussman | 350/267 |
| 4,173,757 | 11/1979 | Hareng et al. | 350/331 |
| 4,514,920 | 5/1985 | Shafrir et al. | 40/448 |
| 4,656,466 | 4/1987 | Yoshida et al. | 340/716 |
| 5,269,977 | 12/1993 | Nakahasi et al. | 264/50 |
| 5,636,185 | 6/1997 | Brewer et al. | 368/84 |

FOREIGN PATENT DOCUMENTS

| | | |
|---|---|---|
| 19520811 | 12/1995 | Germany . |
| 08305295 | 11/1996 | Japan . |
| 2 143987 | 5/1984 | United Kingdom . |

Primary Examiner—William L. Sikes
Assistant Examiner—Kari M. Horney
Attorney, Agent, or Firm—Jenkens & Gilchrist, P.C.

[57] ABSTRACT

The disclosure proposes the use of a graphical background for liquid crystal display assemblies. Two-dimensional graphics are printed on a rear surface of a liquid crystal matrix, a front surface of a lightguide, or a transparent label interposed between the liquid crystal matrix and the lightguide. Alternatively, three-dimensional graphics are covered or molded into a front surface of a lightguide used in the liquid crystal display assembly.

9 Claims, 4 Drawing Sheets

STATIC THREE-DIMENSIONAL GRAPHICAL BACKGROUND FOR LIQUID CRYSTAL DISPLAYS

BACKGROUND OF THE INVENTION

1. Technical Field of the Invention

The present invention pertains in general to liquid crystal display assemblies, and more particularly, to an apparatus for creating two-dimensional and three-dimensional static graphical backgrounds on liquid crystal display assemblies.

2. Description of Related Art

Liquid crystal display assemblies are typically constructed of a liquid crystal matrix mounted or affixed to a lightguide with the lightguide diffusing light from a light source across the liquid crystal matrix to illuminate an image produced by the matrix. When a liquid crystal matrix is inactive, only the lightguide, typically white or silver in color, is visible. When the liquid crystal matrix is active and producing an image, the user sees dynamic graphics with a lightguide background. It would be advantageous to devise an apparatus for displaying additional static graphics, such as a manufacturer or application logo, as a part of the background for the liquid crystal display assembly. Such graphics would be visible during periods when the liquid crystal matrix is both active and inactive.

SUMMARY OF THE INVENTION

The present invention comprises a liquid crystal display assembly having either a two-dimensional or three-dimensional static background graphical image. A two-dimensional background graphical image is created by either printing graphics on a rear surface of a liquid crystal matrix or a front surface of a lightguide. Alternatively, the graphics may be printed on a transparent label which is interposed between the rear surface of the liquid crystal matrix and the front surface of the lightguide. A three-dimensional background graphical image is created by carving, molding or etching graphics into the surface of the lightguide used in the liquid crystal display assembly.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF EMBODIMENTS

Figure 1A:
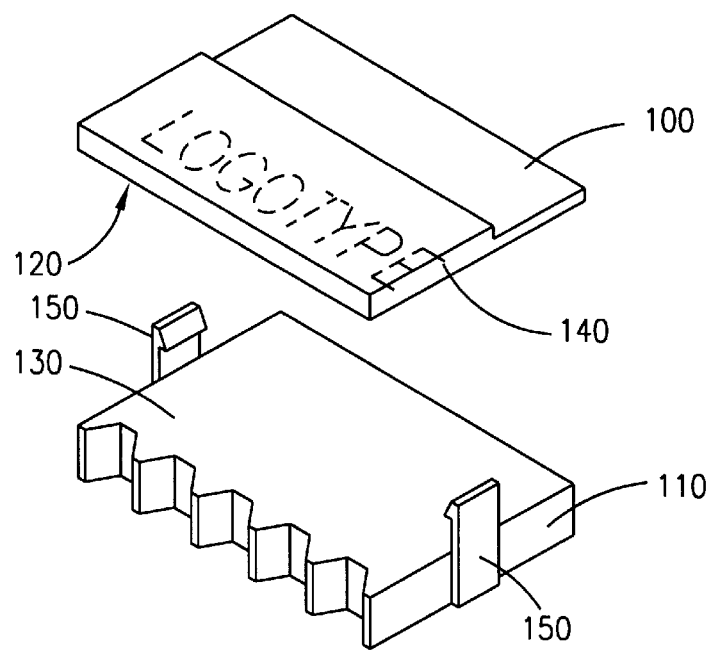
FIG. 1A is an exploded or alternatively "unassembled" perspective view of a liquid crystal display assembly incorporating the present invention, wherein a graphical background is printed on a rear surface of a liquid crystal matrix.

Referring now to FIG. 1A there is illustrated a liquid crystal display assembly comprised of a liquid crystal matrix 100 and a lightguide 110. The liquid crystal matrix 100 may be electrically driven to produce a visible image. The matrix further includes a rear surface 120. The lightguide 110 illuminates the produced image, and further includes a front surface 130.

In a first embodiment of the present invention, graphics 140 creating a static two-dimensional graphical background are printed on the rear surface 120 of the liquid crystal matrix 100. Any method of printing, including, but not limited to, pad printing, screen printing, and photolithography printing, can be used to print the graphics 140 on the rear surface 120 of the liquid crystal matrix 100. Once the graphics 140 have been printed on the rear surface 120 of the liquid crystal matrix 100, the liquid crystal matrix 100 is mounted adjacent the front surface 130 of the lightguide 110 using latches 150.

Figure 1B:
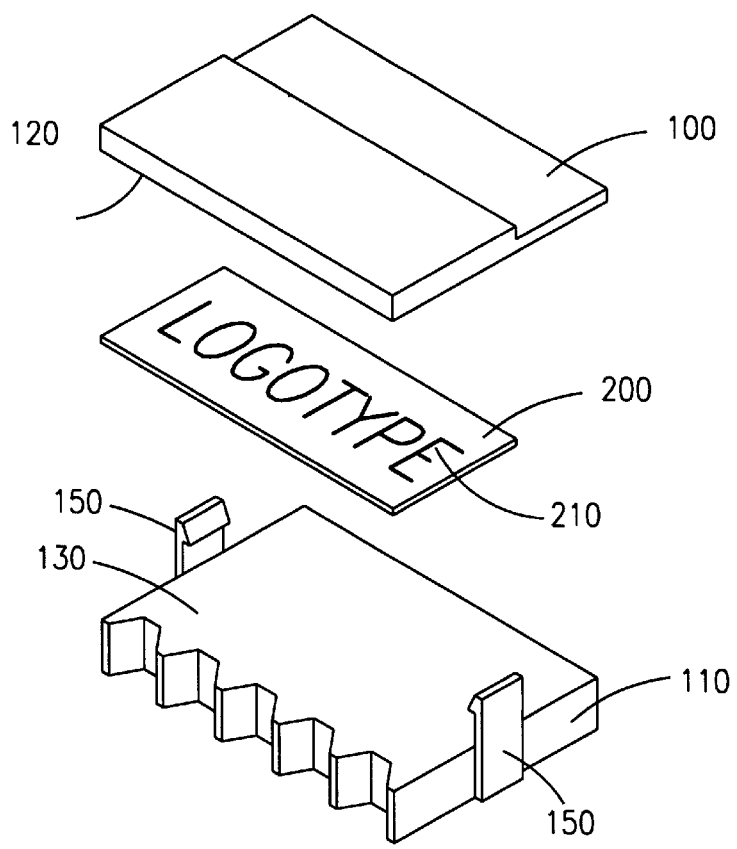
FIG. 1B is an exploded or alternatively "unassembled" perspective view of a liquid crystal display assembly incorporating the present invention wherein a graphical background is printed on a transparent label.

Referring additionally now to FIG. 1B, there is illustrated a second embodiment of the present invention. A transparent label 200 is printed with graphics 210 forming the static two-dimensional graphical background for the liquid crystal display assembly. The graphics 210 can be printed on the transparent label 200 using any method of printing, including, but not limited to, pad printing, screen printing, and photolithography printing. The liquid crystal display assembly is assembled by interposing the transparent label 200 between the liquid crystal matrix 100 and the lightguide 110. The liquid crystal matrix 100 is mounted to the lightguide 110 using latches 150, thereby holding the transparent label 200 in place between the rear surface 120 of the liquid crystal matrix 100 and the front surface 130 of the lightguide 110. The liquid crystal display matrix 100 can also be affixed to the lightguide 110 using any method including but not limited to taping, glueing, or clamping.

Figure 1C:
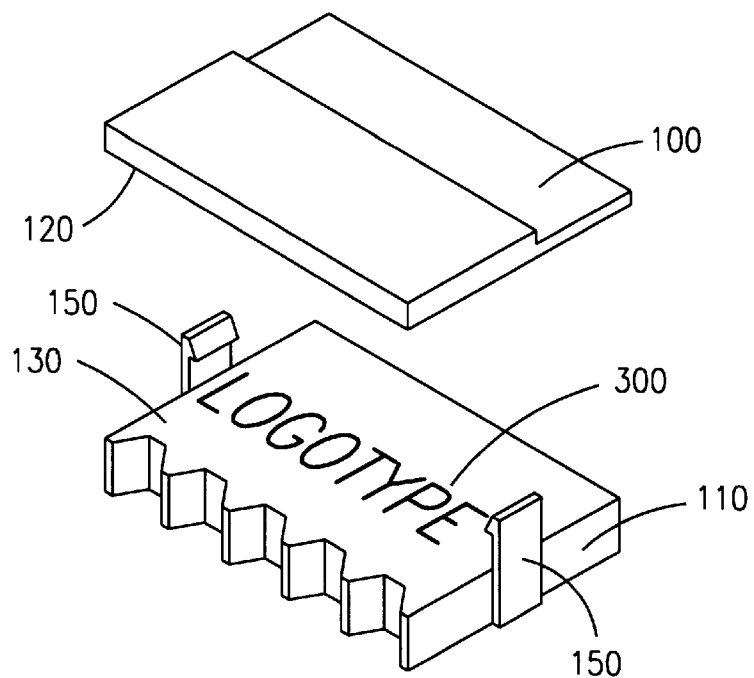
FIG. 1C is an exploded or alternatively "unassembled" perspective view of a liquid crystal matrix incorporating the present invention, wherein a graphical background is printed on a front surface of a lightguide.

Referring additionally now to FIG. 1C, there is illustrated a third embodiment of the present invention. In this embodiment graphics 300 forming the static two-dimensional graphical background of the liquid crystal display assembly is printed on the front surface 130 of the lightguide 110. The graphics 300 can be printed on the front surface 130 in any manner including, but not limited to, pad printing, screen printing, and photolithography. Once the graphics 300 are printed on the front surface 130 of the lightguide 110, the liquid crystal matrix 100 is mounted or affixed to the lightguide 110.

Figure 1D:
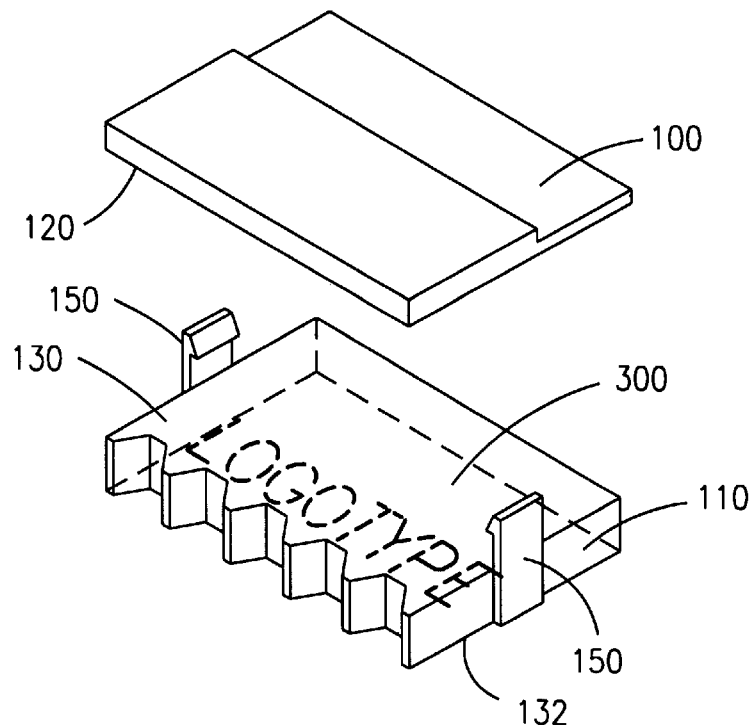
FIG. 1D is an exploded or alternatively "unassembled" perspective view of a liquid crystal matrix incorporating the present invention, wherein a graphical background is printed on a rear surface of a transparent light guide.

Referring additionally now to FIG. 1D, there is illustrated a fourth embodiment of the present invention. In this embodiment the graphics 300 forming the static two-dimensional graphical background of the liquid display assembly is printed on the rear surface 132 of the transparent lightguide 110. The graphics 300 can be printed on the rear surface 132 in any manner including, but not limited to, pad printing, screen printing, and photo lithography. Once the graphics 300 are printed on the rear surface 132 of the transparent lightguide 110 the liquid crystal matrix 100 is mounted or affixed to the transparent lightguide 110.

Figure 2A:
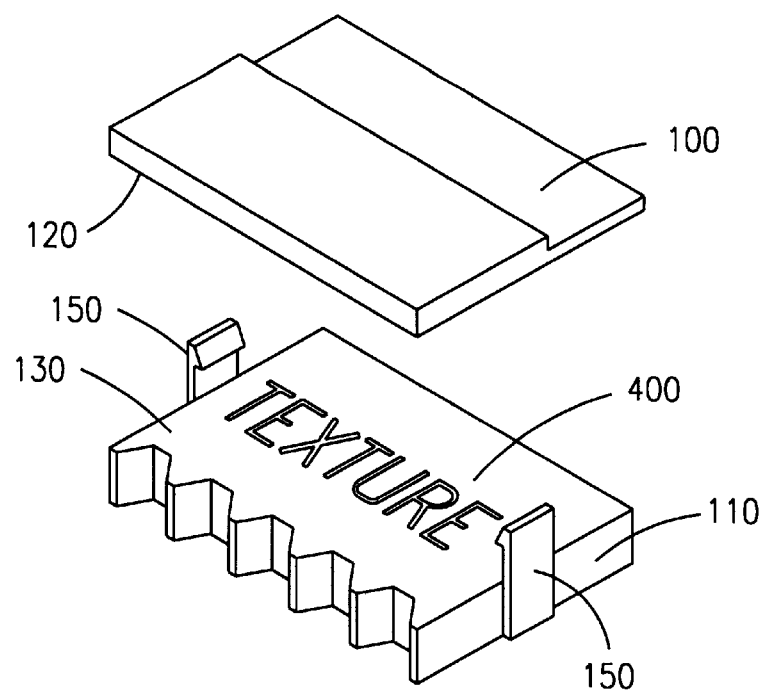
FIG. 2A is an exploded or alternatively "unassembled" perspective view of a liquid crystal display assembly incorporating the present invention, wherein a three-dimensional graphical background is molded on a front surface of a lightguide.

Referring additionally now to FIG. 2A, there is illustrated a fifth embodiment of the present invention. Similar to the third embodiment described in FIG. 1C, the fifth embodiment of the present invention also places graphical text 400 on the front surface 130 of the lightguide 110. Unlike all of the previous embodiments of the present invention (FIGS. 1A–1D) wherein the graphical background is a two-dimensional printing, the graphics 400 of the fifth embodiment are three-dimensional graphics. Any method can be used to create three-dimensional graphics 400 on the front surface 130 of the lightguide 110, including but not limited to carving or etching the graphics 400 into the front surface 130 after the lightguide 110 has been manufactured or molding the graphics 400 into the front surface 130 during the molding process which creates the lightguide 110. In any event, once the graphics 400 have been carved or molded into the surface 130 of the lightguide 110, the liquid crystal matrix 100 is mounted or affixed to the lightguide 110. The three-dimensional graphics 400 may also be colored with ink to provide better definition to the graphics 400.

Figure 2B:
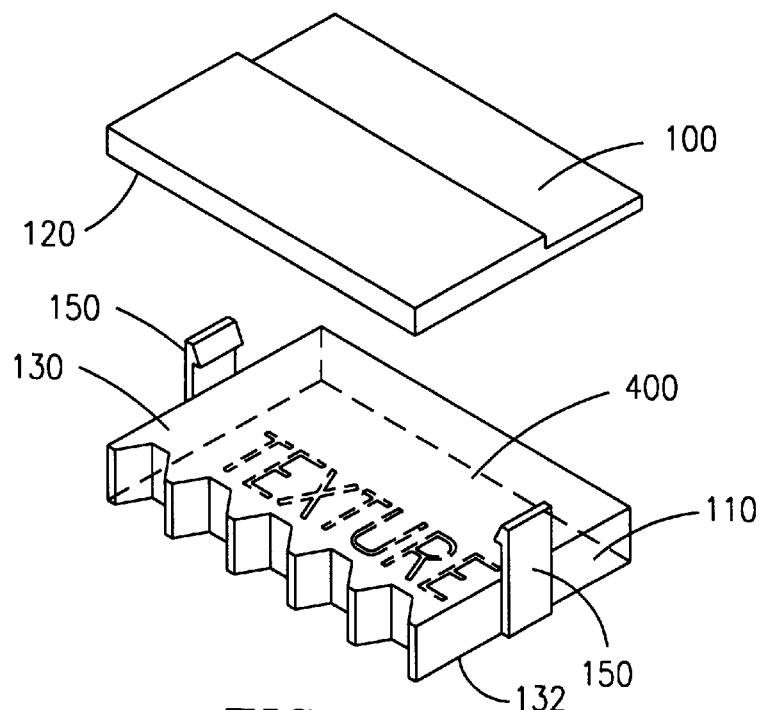
FIG. 2B is an exploded or alternatively "unassembled" perspective view of a liquid crystal display assembly incorporating the present invention, wherein a three-dimensional graphical background is molded on a rear surface of a transparent lightguide.

Referring additionally now to FIG. 2B, there is illustrated a sixth embodiment of the present invention. Similar to the fourth embodiment described in FIG. 1D, the sixth embodiment of the present invention also places graphical text 400 on the rear surface 132 of the transparent lightguide 110. Instead of using two-dimensional printing, the graphics 400 of the sixth embodiment are three-dimensional graphics. Any method can be used to create three-dimensional graphics 400 on the rear surface 132 of the transparent lightguide 110, including but not limited to carving or etching the graphics 400 into the rear surface 132 after the light guide 110 has been manufactured or molding the graphics 400 into the rear surface 132 during the molding process which creates the lightguide 110. In either event, once the graphics 400 have been carved or molded into the surface 132 of the lightguide 110, the liquid crystal matrix 100 is mounted or affixed to the light guide 110. The three-dimensional graphics 400 may also be colored with ink to provide better definition to the graphics 400.

Figure 3:
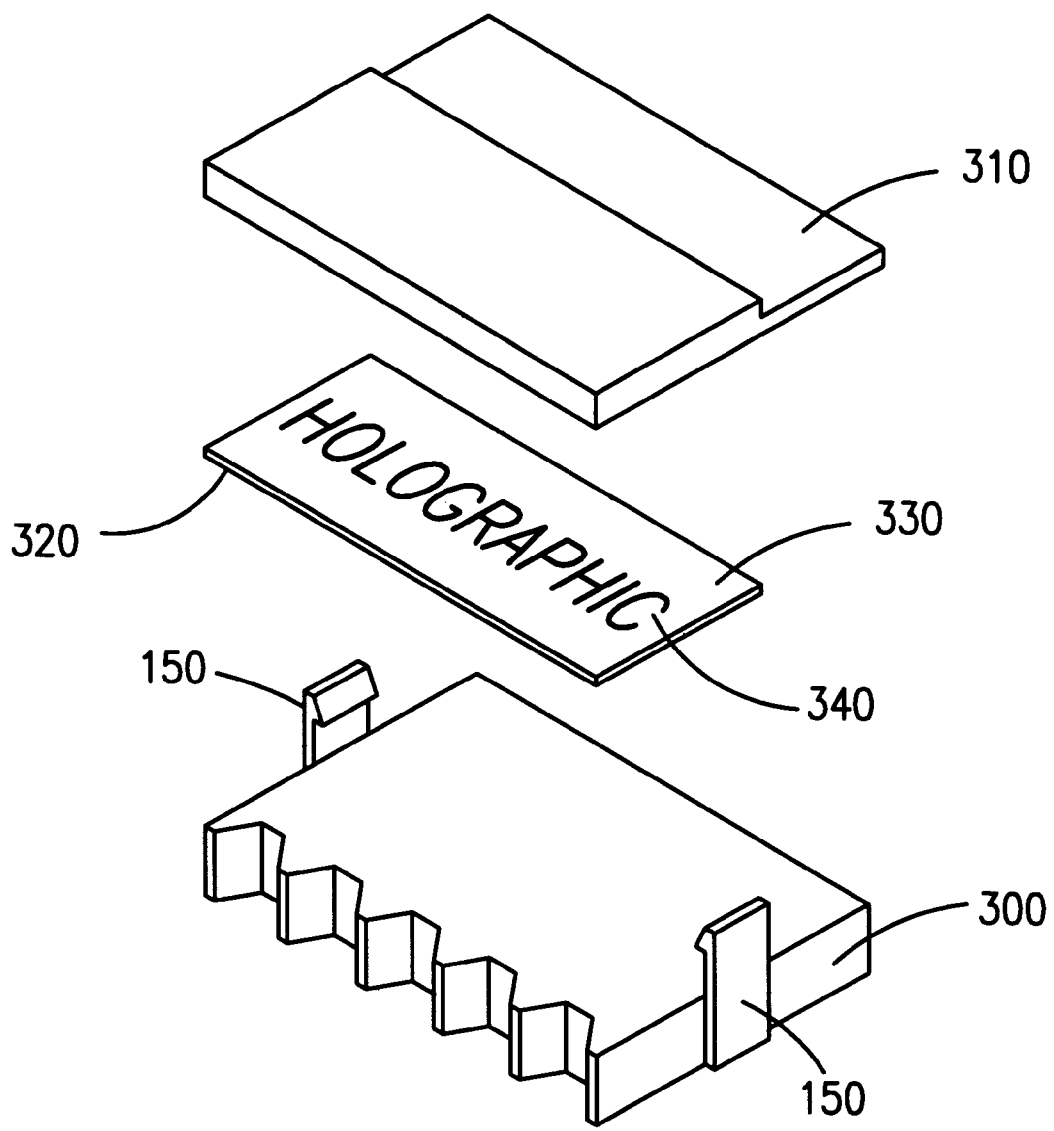
FIG. 3 is an exploded or alternatively "unassembled" perspective view of a liquid crystal display assembly incorporating the present invention, wherein a holographic image is printed on a silvery label of a liquid crystal display.

Referring additionally now to FIG. 3, there is illustrated a seventh embodiment of the present invention. The liquid crystal display assembly includes a light guide 300, a liquid crystal matrix 310, and a silvery label 320. Printed on the front surface 330 of the silvery label 320 is a holographic image 340. The holographic image 340 can be printed on the silvery label 320 using any known method for printing holographic images. The silvery label 320 is typically included with a liquid crystal matrix 310 and is colored silver to provide a uniform background to the liquid crystal matrix 310. Although the silvery label 320 may be included on the rear surface 120 of the liquid crystal matrix 100 of the previous embodiments the graphical images of the previous embodiments can be seen through the silvery label. The holographic image 340, however, is interposed between the liquid crystal matrix 310 and the silvery label 320 by printing it on the front surface 330 of the silvery label 320 since the holographic image can not be viewed through the silvery label 320.

The liquid crystal matrix 310 and the silvery label 320 are mounted to the light guide 300 using latches 150, thereby holding the silvery label 320 in place between the liquid crystal matrix 310 and the light guide 300. The liquid crystal matrix 310 can also be affixed to the light guide 300 using any method including but not limited to taping, gluing, or clamping.

Although embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A liquid crystal display assembly, comprising:

a liquid crystal matrix having a rear surface;

a lightguide having a front surface, the front surface of the lightguide positioned adjacent the rear surface of the liquid crystal matrix to illuminate the liquid crystal matrix; and a three-dimensional graphical image placed on the front surface of the lightguide.

2. The assembly of claim 1, wherein the three-dimensional graphical image comprises graphical image carved into the front surface of the lightguide.

3. The assembly of claim 1, wherein the three-dimensional graphical image comprises graphical image molded into the front surface of the lightguide.

4. The assembly of claim 1, wherein the three-dimensional graphical image comprises graphical image etched into the front surface of the lightguide.

5. The assembly of claim 1, wherein the three-dimensional graphical image is a colored image.

6. A liquid crystal display assembly, comprising:

a liquid crystal matrix having a rear surface;

a lightguide having a front and a rear surface, the front surface of the lightguide positioned adjacent the rear surface of the liquid crystal matrix to illuminate the liquid crystal matrix; and a three-dimensional graphical image placed on the rear surface of the lightguide.

7. The assembly of claim 6, wherein the three-dimensional graphical image comprises graphical image carved into the rear surface of the lightguide.

8. The assembly of claim 6, wherein the three-dimensional graphical image comprises graphical image molded into the rear surface of the lightguide.

9. The assembly of claim 6, wherein the three-dimensional graphical image comprises graphical image etched into the rear surface of the lightguide.

\* \* \* \* \*